(12) United States Patent
Boorman et al.

(10) Patent No.: US 8,494,691 B2
(45) Date of Patent: Jul. 23, 2013

(54) APPARATUSES AND METHODS FOR DISPLAYING AUTOFLIGHT INFORMATION

(75) Inventors: Daniel J. Boorman, Woodinville, WA (US); Peter D. Gunn, Bellevue, WA (US); John C. Griffin, III, University Place, WA (US)

(73) Assignee: The Boeing Company, Chicago, IL (US)

( * ) Notice: Subject to any disclaimer, the term of this patent is extended or adjusted under 35 U.S.C. 154(b) by 226 days.

(21) Appl. No.: 13/008,789

(22) Filed: Jan. 18, 2011

(65) Prior Publication Data

US 2011/0125347 A1    May 26, 2011

Related U.S. Application Data

(62) Division of application No. 12/414,559, filed on Mar. 30, 2009, which is a division of application No. 10/251,493, filed on Sep. 20, 2002, now abandoned.

(51) Int. Cl.
*G01C 23/00* (2006.01)

(52) U.S. Cl.
USPC ............... 701/14; 701/13; 340/971; 340/973; 340/980

(58) Field of Classification Search
CPC ................................ B64D 43/00; B64D 43/02
USPC ...................................................... 701/11, 14
See application file for complete search history.

(56) References Cited

U.S. PATENT DOCUMENTS

| | | |
|---|---|---|
| 3,191,147 A | 6/1965 | Majendie |
| 3,577,120 A | 5/1971 | Sherbert, Jr. |
| 3,696,671 A | 10/1972 | Steigleder et al. |
| 3,706,969 A | 12/1972 | Paredes |
| 3,784,969 A | 1/1974 | Wilckens et al. |
| 3,848,833 A | 11/1974 | Rauschelbach |

(Continued)

FOREIGN PATENT DOCUMENTS

| | | |
|---|---|---|
| DE | 3315386 A | 10/1984 |
| DE | 4140406 | 6/1993 |

(Continued)

OTHER PUBLICATIONS

777 Flight Deck (1 page) http://www.meriweather.com/777/777_main.html [Accessed Jan. 28, 2003].

(Continued)

*Primary Examiner* — Khoi Tran
*Assistant Examiner* — Ryan Rink
(74) *Attorney, Agent, or Firm* — Perkins Coie LLP

(57) ABSTRACT

Apparatuses and methods for displaying autoflight information and controlling autoflight systems. In one embodiment, a flight deck for an aircraft having an autoflight system includes at least one pilot seat, at least one window positioned forward of the pilot seat, and a forward instrument panel positioned forward of the pilot seat. In one aspect of this embodiment, the forward window provides a forward field of view out of the aircraft for a pilot seated in the pilot seat. In another aspect of this embodiment, the flight deck further includes a display device configured to provide information related to one or more autoflight modes. The display device can be positioned at least approximately between the forward instrument panel and the forward window to provide the pilot with autoflight information at least proximate to the forward field of view. In a further aspect of this embodiment, the display device can be configured to provide information related to one or more target flight parameters.

17 Claims, 7 Drawing Sheets

U.S. PATENT DOCUMENTS

| | | |
|---|---|---|
| 3,967,098 A | 6/1976 | Harnagel et al. |
| 4,035,705 A | 7/1977 | Miller |
| 4,043,526 A | 8/1977 | Donley et al. |
| 4,147,056 A | 4/1979 | Muller |
| 4,196,474 A | 4/1980 | Buchanan et al. |
| 4,212,064 A | 7/1980 | Forsythe et al. |
| 4,224,569 A | 9/1980 | Campbell |
| 4,224,669 A | 9/1980 | Brame |
| 4,247,843 A | 1/1981 | Miller et al. |
| 4,274,096 A | 6/1981 | Dennison |
| 4,325,123 A | 4/1982 | Graham et al. |
| 4,424,038 A | 1/1984 | Tingleff et al. |
| 4,471,439 A | 9/1984 | Robbins et al. |
| 4,536,843 A | 8/1985 | Lambregts |
| H139 H | 10/1986 | Task |
| 4,631,678 A | 12/1986 | Angermuller et al. |
| 4,642,775 A | 2/1987 | Cline |
| 4,729,102 A | 3/1988 | Miller, Jr. et al. |
| 4,746,981 A | 5/1988 | Nadan et al. |
| 4,792,906 A | 12/1988 | King et al. |
| 4,845,495 A | 7/1989 | Bollard et al. |
| 4,860,007 A | 8/1989 | Konicke et al. |
| 4,939,661 A | 7/1990 | Barker et al. |
| 5,050,081 A | 9/1991 | Abbott et al. |
| 5,053,967 A | 10/1991 | Clavelloux et al. |
| 5,070,458 A | 12/1991 | Gilmore et al. |
| 5,072,218 A | 12/1991 | Spero et al. |
| 5,200,902 A | 4/1993 | Pilley |
| 5,222,691 A | 6/1993 | Gold et al. |
| 5,238,203 A | 8/1993 | Skonieczny et al. |
| 5,243,339 A | 9/1993 | Graham et al. |
| 5,283,643 A | 2/1994 | Fujimoto |
| 5,289,185 A | 2/1994 | Ramier et al. |
| 5,310,135 A | 5/1994 | Fowler et al. |
| 5,310,136 A | 5/1994 | Fowler et al. |
| 5,329,277 A | 7/1994 | Dougan et al. |
| 5,337,982 A | 8/1994 | Sherry |
| 5,343,395 A | 8/1994 | Watts |
| 5,416,705 A | 5/1995 | Barnett |
| 5,420,582 A | 5/1995 | Kubbat et al. |
| 5,454,074 A | 9/1995 | Hartel et al. |
| 5,475,594 A | 12/1995 | Oder et al. |
| 5,499,025 A | 3/1996 | Middleton et al. |
| 5,508,928 A | 4/1996 | Tran |
| 5,519,392 A | 5/1996 | Oder et al. |
| 5,519,618 A | 5/1996 | Kastner et al. |
| 5,523,949 A | 6/1996 | Agate et al. |
| 5,592,198 A | 1/1997 | Fagard et al. |
| 5,593,114 A | 1/1997 | Ruhl |
| 5,629,691 A | 5/1997 | Jain |
| 5,668,542 A | 9/1997 | Wright |
| 5,712,785 A | 1/1998 | Mok et al. |
| 5,715,163 A | 2/1998 | Bang |
| 5,736,955 A | 4/1998 | Roif |
| 5,739,769 A | 4/1998 | Vladimir et al. |
| 5,745,054 A | 4/1998 | Wilkens |
| 5,745,866 A | 4/1998 | Steiner |
| 5,746,392 A | 5/1998 | Gast |
| 5,790,209 A | 8/1998 | Engelhardt et al. |
| 5,798,712 A | 8/1998 | Coquin et al. |
| 5,802,492 A | 9/1998 | DeLorme et al. |
| 5,803,408 A | 9/1998 | Gast |
| 5,825,306 A | 10/1998 | Hiyokawa et al. |
| 5,844,503 A | 12/1998 | Riley et al. |
| 5,875,998 A | 3/1999 | Gleine |
| 5,884,219 A | 3/1999 | Curtwright et al. |
| 5,901,927 A | 5/1999 | Ho |
| 5,916,297 A | 6/1999 | Griffin, III et al. |
| 5,920,321 A | 7/1999 | Owen et al. |
| 5,940,013 A | 8/1999 | Vladimir et al. |
| 5,941,930 A | 8/1999 | Morimoto et al. |
| 5,971,318 A | 10/1999 | Lustre |
| 5,978,715 A | 11/1999 | Briffe et al. |
| 5,983,158 A | 11/1999 | Suzuki et al. |
| 5,995,290 A | 11/1999 | Noble |
| 5,995,901 A | 11/1999 | Owen et al. |
| 6,005,513 A | 12/1999 | Hardesty |
| 6,038,498 A | 3/2000 | Briffe et al. |
| 6,057,786 A | 5/2000 | Briffe et al. |
| 6,067,502 A | 5/2000 | Hayashida et al. |
| 6,072,473 A | 6/2000 | Muller et al. |
| 6,075,467 A | 6/2000 | Ninagawa et al. |
| 6,085,129 A | 7/2000 | Schardt et al. |
| 6,112,141 A | 8/2000 | Briffe et al. |
| 6,118,385 A | 9/2000 | Leard et al. |
| 6,121,899 A | 9/2000 | Theriault |
| 6,128,553 A | 10/2000 | Gordon et al. |
| 6,154,151 A | 11/2000 | McElreath et al. |
| 6,161,062 A | 12/2000 | Sicre et al. |
| 6,163,309 A | 12/2000 | Weinert |
| 6,175,315 B1 | 1/2001 | Millard et al. |
| 6,181,987 B1 | 1/2001 | Deker et al. |
| 6,188,937 B1 | 2/2001 | Sherry et al. |
| 6,199,015 B1 | 3/2001 | Curtwright et al. |
| 6,246,320 B1 | 6/2001 | Monroe |
| 6,246,342 B1 | 6/2001 | Vandevoorde et al. |
| 6,262,720 B1 | 7/2001 | Jeffrey et al. |
| 6,275,172 B1 | 8/2001 | Curtis et al. |
| 6,278,913 B1 | 8/2001 | Jiang et al. |
| 6,289,277 B1 | 9/2001 | Feyereisen et al. |
| 6,313,759 B1 | 11/2001 | Musland-Sipper |
| 6,314,343 B1 | 11/2001 | Adams et al. |
| 6,314,363 B1 | 11/2001 | Pilley et al. |
| 6,314,366 B1 | 11/2001 | Farmakis et al. |
| 6,314,370 B1 | 11/2001 | Curtright |
| 6,328,264 B1 | 12/2001 | Maeda et al. |
| 6,335,694 B1 | 1/2002 | Beksa et al. |
| 6,346,892 B1 | 2/2002 | DeMers et al. |
| 6,362,750 B1 | 3/2002 | Castor et al. |
| 6,381,519 B1 | 4/2002 | Snyder |
| 6,381,538 B1 | 4/2002 | Robinson et al. |
| 6,389,333 B1 | 5/2002 | Hansman et al. |
| 6,405,975 B1 | 6/2002 | Sankrithi et al. |
| 6,424,909 B2 | 7/2002 | Kusano et al. |
| 6,442,394 B1 | 8/2002 | Valentine et al. |
| 6,443,399 B1 | 9/2002 | Yount et al. |
| 6,449,556 B1 | 9/2002 | Pauly |
| 6,453,236 B1 | 9/2002 | Aoki |
| 6,462,697 B1 | 10/2002 | Klamer et al. |
| 6,466,235 B1 | 10/2002 | Smith et al. |
| 6,470,224 B1 | 10/2002 | Drake et al. |
| 6,473,675 B2 | 10/2002 | Sample |
| 6,507,739 B1 | 1/2003 | Gross et al. |
| 6,512,527 B1 | 1/2003 | Barber et al. |
| 6,522,958 B1 | 2/2003 | Dwyer et al. |
| 6,542,796 B1 | 4/2003 | Gibbs et al. |
| 6,545,601 B1 | 4/2003 | Monroe |
| 6,553,307 B2 | 4/2003 | Stratton et al. |
| 6,556,902 B2 | 4/2003 | Ing et al. |
| 6,561,463 B1 | 5/2003 | Yount et al. |
| 6,571,166 B1 | 5/2003 | Johnson et al. |
| 6,606,563 B2 | 8/2003 | Corcoran, III |
| 6,614,397 B2 | 9/2003 | Pullen et al. |
| 6,614,419 B1 | 9/2003 | May |
| 6,633,810 B1 | 10/2003 | Qureshi et al. |
| 6,636,786 B2 | 10/2003 | Partel |
| 6,668,215 B2 | 12/2003 | Lafon et al. |
| 6,690,295 B1 | 2/2004 | De Boer |
| 6,690,299 B1 | 2/2004 | Suiter |
| 6,693,559 B1 | 2/2004 | Gyde et al. |
| 6,694,249 B1 | 2/2004 | Anderson et al. |
| 6,696,980 B1 | 2/2004 | Langner et al. |
| 6,697,718 B2 | 2/2004 | Le Draoullec et al. |
| 6,707,387 B2 | 3/2004 | Noguchi et al. |
| 6,707,475 B1 | 3/2004 | Snyder |
| 6,710,723 B2 | 3/2004 | Muller et al. |
| 6,711,475 B2 | 3/2004 | Murphy |
| 6,720,891 B2 | 4/2004 | Chen et al. |
| 6,721,640 B2 | 4/2004 | Glenn et al. |
| 6,735,505 B2 | 5/2004 | Levine |
| 6,745,113 B2 | 6/2004 | Griffin et al. |
| 6,751,545 B2 | 6/2004 | Walter |
| 6,753,891 B1 | 6/2004 | Chohan et al. |
| 6,759,946 B2 | 7/2004 | Sahinoglu et al. |
| 6,784,869 B1 | 8/2004 | Clark et al. |
| 6,789,010 B2 | 9/2004 | Walter |
| 6,812,858 B2 | 11/2004 | Griffin, III |

| | | |
|---|---|---|
| 6,816,780 B2 | 11/2004 | Naimer et al. |
| 6,842,672 B1 | 1/2005 | Straub et al. |
| 6,856,864 B1 | 2/2005 | Gibbs et al. |
| 6,862,519 B2 | 3/2005 | Walter |
| 6,870,490 B2 | 3/2005 | Sherry et al. |
| 6,871,124 B1 | 3/2005 | McElreath |
| 6,897,790 B2 | 5/2005 | Orton |
| 6,898,492 B2 | 5/2005 | de Leon et al. |
| 6,909,967 B2 | 6/2005 | Hirano et al. |
| 6,915,190 B2 | 7/2005 | Galasso |
| 6,922,631 B1 | 7/2005 | Dwyer et al. |
| 6,927,782 B2 | 8/2005 | Coldefy et al. |
| 6,934,608 B2 | 8/2005 | Qureshi |
| 6,946,976 B1 | 9/2005 | Langner et al. |
| 6,957,130 B1 | 10/2005 | Horvath et al. |
| 6,980,198 B1 | 12/2005 | Gyde et al. |
| 6,992,596 B2 | 1/2006 | Cole et al. |
| 6,992,597 B2 | 1/2006 | Rogers et al. |
| 7,024,287 B2 | 4/2006 | Peckham et al. |
| 7,030,892 B2 | 4/2006 | Gyde et al. |
| 7,039,505 B1 | 5/2006 | Southard et al. |
| 7,039,509 B2 | 5/2006 | Podowski |
| 7,049,953 B2 | 5/2006 | Monroe |
| 7,057,549 B2 | 6/2006 | Block |
| 7,072,746 B1 | 7/2006 | Burch |
| 7,093,070 B2 | 8/2006 | Rowlan |
| 7,103,455 B2 | 9/2006 | Subelet et al. |
| 7,142,131 B2 | 11/2006 | Sikora |
| 7,148,814 B2 | 12/2006 | Sikora et al. |
| 7,148,815 B2 | 12/2006 | Derringer |
| 7,177,731 B2 | 2/2007 | Sandell et al. |
| 7,181,478 B1 | 2/2007 | Korson et al. |
| 7,188,007 B2 | 3/2007 | Boorman et al. |
| 7,203,577 B2 | 4/2007 | Gunn et al. |
| 7,216,069 B2 | 5/2007 | Hett |
| 7,222,017 B2 | 5/2007 | Clark et al. |
| 7,230,632 B2 | 6/2007 | Coldefy et al. |
| 7,256,710 B2 | 8/2007 | Mumaw et al. |
| 7,321,318 B2 | 1/2008 | Crane et al. |
| 7,345,693 B2 | 3/2008 | Coldefy et al. |
| 7,363,119 B2 | 4/2008 | Griffin, III et al. |
| 7,418,319 B2 | 8/2008 | Chen et al. |
| 7,460,029 B2 | 12/2008 | Boorman et al. |
| 7,577,501 B2 | 8/2009 | Tafs et al. |
| 7,580,235 B2 | 8/2009 | Hamasaki et al. |
| 7,603,209 B2 | 10/2009 | Dwyer et al. |
| 7,676,303 B2 | 3/2010 | Hanel |
| 7,711,457 B2 | 5/2010 | Caillaud |
| RE41,396 E | 6/2010 | Clark et al. |
| 7,751,947 B2 | 7/2010 | Gunn et al. |
| 7,751,948 B2 | 7/2010 | Boorman et al. |
| 7,783,393 B2 | 8/2010 | Tucker et al. |
| 7,813,845 B2 | 10/2010 | Doose et al. |
| 7,835,825 B2 | 11/2010 | Coulmeau et al. |
| 7,945,354 B2 | 5/2011 | Boorman et al. |
| 8,005,582 B2 | 8/2011 | Boorman et al. |
| 8,032,270 B2 | 10/2011 | Chen et al. |
| 8,135,501 B2 | 3/2012 | Boorman et al. |
| 8,290,643 B2 | 10/2012 | Chen et al. |
| 2002/0030609 A1 | 3/2002 | Baumgartner et al. |
| 2002/0033837 A1 | 3/2002 | Munro |
| 2002/0120392 A1 | 8/2002 | Stratton et al. |
| 2003/0009278 A1 | 1/2003 | Mallet et al. |
| 2003/0025719 A1 | 2/2003 | Palmer et al. |
| 2003/0045994 A1 | 3/2003 | Stratton et al. |
| 2003/0050805 A1 | 3/2003 | Gouyet et al. |
| 2003/0132860 A1 | 7/2003 | Feyereisen et al. |
| 2003/0225492 A1 | 12/2003 | Cope et al. |
| 2004/0006412 A1 | 1/2004 | Doose et al. |
| 2004/0059474 A1 | 3/2004 | Boorman et al. |
| 2004/0059497 A1 | 3/2004 | Sankrithi |
| 2004/0230352 A1 | 11/2004 | Monroe |
| 2005/0085959 A1 | 4/2005 | Feyereisen |
| 2005/0090969 A1 | 4/2005 | Siok et al. |
| 2006/0005147 A1 | 1/2006 | Hammack et al. |
| 2006/0238511 A1 | 10/2006 | Gyde et al. |
| 2007/0179703 A1 | 8/2007 | Soussiel et al. |
| 2008/0039984 A1 | 2/2008 | Bitar et al. |
| 2008/0065275 A1 | 3/2008 | Vizzini |
| 2008/0251308 A1 | 10/2008 | Molnar et al. |
| 2008/0312776 A1 | 12/2008 | Sylvester |
| 2008/0316058 A1 | 12/2008 | Chen et al. |
| 2009/0062972 A1 | 3/2009 | Boorman et al. |
| 2009/0306887 A1 | 12/2009 | Clark et al. |
| 2010/0076627 A1 | 3/2010 | Boorman et al. |
| 2010/0076628 A1 | 3/2010 | Boorman et al. |
| 2010/0262358 A1 | 10/2010 | Boorman et al. |
| 2011/0224848 A1 | 9/2011 | Boorman et al. |

FOREIGN PATENT DOCUMENTS

| | | |
|---|---|---|
| EP | 0286120 | 10/1988 |
| EP | 0370640 | 6/1992 |
| EP | 0489521 | 6/1992 |
| EP | 1273987 | 1/2003 |
| FR | 2817831 A1 | 6/2002 |
| FR | 2848306 | 6/2004 |
| GB | 886136 | 1/1962 |
| GB | 2144248 A | 2/1985 |
| JP | 05338594 | 12/1993 |
| JP | 07113652 A | 5/1995 |
| JP | 2002013935 A | 1/2002 |
| WO | WO-0224530 | 3/2002 |
| WO | WO-2004027732 A1 | 4/2004 |

OTHER PUBLICATIONS

Andre, A.D., "Information Requirements for Low-Visibility Taxi Operations: What Pilot Say," Western Aerospace Labs, Inc.,NASA Ames Research Center, pp. 484-487.

Batson et al., "Navigating the Airport Surface: Electronic vs. Paper Maps," AIAA/IEEE Digital Avionics Systems Conference,13th DASC, Phoenix, AZ, USA, Oct. 30-Nov. 3, 1998, pp. 515-520.

Deltasoft, F-15 Cockpit, Aug. 2001, <http://web.archive.org/web/20010803031953/http://deltasoft.fife.wa.us/cockpit.htm> accessed Aug. 14, 2007.

European Search Report, the Boeing Company, European Patent Appliation No. 0307771, Dec. 18, 2003. (2 pgs.).

Hooey et al., "Integrating datalink and cockpit display technologies into current and future taxi operations," Digital Avionics Systems Conferences, V2, 8 pages (2000).

Hutchins, Edwin, "The Integrated Mode Management Interface," Department of Cognitive Science, University of California, San Diego, Sep. 17, 1996.

International Search Report and Written Opinion for PCT/US2005/005230, Applicant: The Boeing Company, Date of Mailing: Feb. 14, 2006, 9 pages.

Jones et al., "Airport Surface Movement Technologies Atlanta Demonstration Overview," Proceedings of 17th Digital Avionics Systems Conference, Bellevue, WA, USA Oct. 31-Nov 7, 1998, pp. F21/1-10.

Jones et al., "Flight Demonstration of Integrated Airport Surface Automation Concepts," Proceedings of the 14th Digital Avionics Systems Conference, Cambridge, MA, USA, Nov. 5-9, 1995, pp. 77-82.

Lindenfeld, "What is an FMS?", Flight Management Systems (5 pages) http://www.ultranet.com/~marzgold//FAQ-FMS.html [Accessed Jun. 3, 2002].

McCann, R.S., et al., "Advanced Navigation Aids in the Flight Deck: Effects on Ground Taxi Performance Under Low Visibility Conditions," Paper Presented at the World Aviation Congress, 1996, Los Angeles, CA.

McCann, R.S., et al., "Enhancing Taxi Performance Under Low Visibility: Are Moving Maps Enough?" Paper Presenting at the Human Factors and Ergonomics Society 41st Annual Meeting, 1997, Santa Monica, CA.

Mejdal et al., "Human Factors Design Guidelines for Multifunction Displays," U.S. Department of Transportation, Oct. 2001, 79 pages.

Meriweather's Flight Deck Flight Acronyms & Definitions (4 pages)http://www.meriweather.com/fd/def.html [Accessed Jun. 3, 2002].

NASA, F-18 Cockpit, 1995, <http://www.dfrc.nasa.gov/gallery/Photo/F-18Chase/Medium/EC95-43155-7.jpg>, accessed Aug. 14, 2007.

Painter et al., "Decision Support for the General Aviation Pilot," Systems, Man, and Cybernetics, IEEE International Conference on Computational Cybernetics and Simulation, Orlando, FL, Oct. 12-15, 1997, pp. 88-93.

PCT International Search Report for PCT/US2005/010335; dated Nov. 30, 2006; European Patent Office; 13 pgs.

Peugeot 406 Handbook, Automobiles Peugeot, Paris, France, May 14, 1993 (pp. 30 and 38).

Presentation by Airbus industries personnel on Jun. 10, 2002 (12 pages) [Engine Display Only].

Theunissen E. et al., "Development and implementation of an Exocentric ASMGCS display," Digital Avionics Systems Conferences, 2000, vol. 2, pp. 7.D 5-1-5.8, Oct. 7, 2000.

Theunissen E. et al., "Design and Evaluation of Taxi Navigation Displays," Paper presented at the Proceedings of the 21 Digital Avionics Systems Conference, 2002, Irvine, CA.

The Boeing Company, 777 Operations Manual, Copyright Dec. 7, 2001.

The Boeing Company, 777 Quick Reference Handbook, Copyright Jun. 26, 2000.

The Boeing Company, 777-200/-200ER/-300 Operations Manual, Copyright 1994.

| SITUATION | FIRST DISPLAY | SECOND DISPLAY | THIRD DISPLAY |
|---|---|---|---|
| CONSTANT HEADING OF 317° | | | HEADING 317° |
| CONSTANT TRACK OF 143° | | | TRACK 143° |
| COURSE 215° TO CHICAGO (ORD) | | | 215° TO ORD |
| CLIMB AT 285kt TO FL250 | SPEED 285KT | CLIMB TO FL250 | |
| CLIMB AT 350kt TO THE CAS/MACH TRANSITION AND THEN CLIMB AT .98 TO FL410 | SPEED 350KT/M.98 | CLIMB TO FL410 | |
| CRUISE AT .98 AT FL410 | SPEED M.98 | CRUISE AT FL419 | |
| DESCEND AT .98 TO THE CAS/MACH TRANSITION AND THEN DESCEND AT 350kt TO 14000ft. | SPEED M.98/350KT | DESCEND TO 14000FT | |
| DESCEND ON GEOMETRIC PATH TO 7000ft AT SPEED BETWEEN 240 AND 255kt | SPEED 240-255KT | PROF DES TO 7000FT | |
| DESCEND AT 200kt TO 3000ft | SPEED 200KT | DESCEND TO 3000FT | |
| FOLLOW THE ILS AT APPROACH SPEED OF 155kt | SPEED 155KT | G/S | LOC |

*Fig. 7*

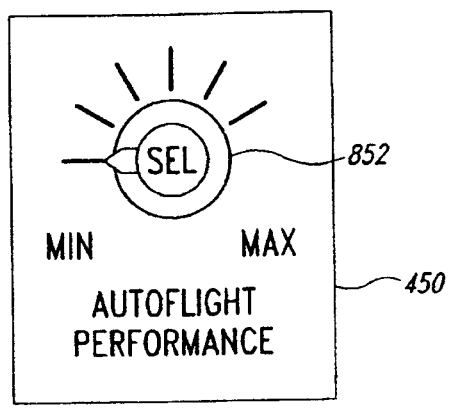

*Fig. 8*

APPARATUSES AND METHODS FOR DISPLAYING AUTOFLIGHT INFORMATION

CROSS-REFERENCE TO RELATED APPLICATION(S) INCORPORATED BY REFERENCE

This application is a divisional application of U.S. patent application Ser. No. 12/414,559, filed on Mar. 30, 2009, entitled APPARATUSES AND METHODS FOR DISPLAYING AUTOFLIGHT INFORMATION, which is a divisional application of U.S. patent application Ser. No. 10/251,493, filed on Sep. 20, 2002, entitled APPARATUSES AND METHODS FOR DISPLAYING AUTOFLIGHT INFORMATION, each of which is incorporated herein by reference in its entirety.

TECHNICAL FIELD

The following disclosure relates generally to aircraft autoflight systems and, more particularly, to apparatuses and methods for displaying autoflight information and controlling autoflight systems.

BACKGROUND

Aircraft autoflight systems have evolved over the years from the traditional autopilots for basic flight path control to complex flight management systems capable of automatically flying aircraft over complicated routes without pilot intervention. Such flight management systems typically include an autopilot, an autothrottle, and a flight management computer (FMC) interfaced with the autopilot and autothrottle. Flight decks on aircraft utilizing such systems generally include a number of controls and displays allowing pilots to monitor the flight management system and change autoflight parameters if desired. As flight management systems have evolved, these controls and displays have been positioned in different locations around the flight deck. Over time, these locations have become somewhat standardized within the transport aircraft industry.

FIG. 1 illustrates a flight deck 100 of an aircraft having a flight management system in accordance with the prior art. The flight deck 100 includes a first pilot seat 102 and a second pilot seat 104 separated by a control pedestal 110. First and second forward windows 108 and 109 are positioned forward of the first and second pilot seats 102 and 104 and provide a forward field of view for first and second pilots (not shown) seated in the first and second pilot seats 102 and 104. A plurality of flight instruments 106 are positioned on a forward instrument panel 111 and the control pedestal 110 for access by the first and second pilots seated in the first and second pilot seats 102 and 104. A glare shield 105 is positioned below the first and second forward windows 108 and 109 to reduce glare on the flight instruments 106.

The flight instruments 106 can include a number of conventional autoflight controls and displays, such as a first control display unit (CDU) 116 positioned on the control pedestal 110 adjacent to the first pilot seat 102, and a second CDU 117 positioned on the control pedestal 110 adjacent to the second pilot seat 104. The first and second CDU's 116 and 117 allow the pilots to make data entries into a flight management computer (FMC) for controlling the flight management system. These entries can include flight plan information such as strategic navigation and flight profile parameters. The flight instruments 106 can also include a first primary flight display (PFD) 114 positioned on the forward instrument panel 111 in front of the first pilot seat 102, and a second PFD 115 positioned on the forward instrument panel 111 in front of the second pilot seat 104. The first and second PFD's 114 and 115 display actual flight parameters of the aircraft, such as airspeed, altitude, attitude and heading. In addition, the first and second PFD's 114 and 115 can also display conventional flight mode annunciators (FMA's). FMA's are textual shorthand codes indicating the current modes of the autothrottle and autopilot. The flight deck 100 can further include a mode control panel (MCP) 112 incorporated into the glare shield 105. The MCP 112 provides control input devices for the FMC, autothrottle, autopilot, flight director, and altitude alert systems.

FIG. 2 is an enlarged view of portions of the flight deck 100 of FIG. 1 including the MCP 112, the first PFD 114, and the first CDU 116 that illustrates a shortcoming of the prior art flight deck 100. Assume the current autoflight guidance instructions are to climb to a cruise altitude of FL210 at an economy airspeed with an intermediate altitude constraint of FL190 at navigation waypoint "MARZY." For a pilot (not shown) to ascertain these instructions, the pilot typically first looks at the first PFD 114 on the forward instrument panel 111 to determine an autoflight mode 209 and target airspeed 211. The autoflight mode 209 of "VNAV SPD" indicates the aircraft is climbing "speed-on-elevator." The target airspeed 211 of "320" indicates the aircraft is climbing at a target airspeed of 320 Kts. The pilot then typically looks at the MCP 112 on the glare shield 105 to determine an altitude 207. The altitude 207 indicates the final cleared altitude is 21,000 ft. (i.e., FL210). Next, the pilot typically looks at the first CDU 116 on the control pedestal 110 to see if there is any intermediate altitude constraint 213 or additional airspeed information 218. In this example, the intermediate altitude constraint 213 indicates a constraint at FL190 at navigation waypoint MARZY. The additional airspeed information 218 indicates that 320 Kts represents an "economy" airspeed with a transition to Mach 0.98 if the climb were sustained. As the foregoing example illustrates, the configuration of the prior art flight deck 100 encourages the pilot to look in three different locations to determine the current autoflight guidance instructions.

SUMMARY

Embodiments of the present invention are directed to apparatuses and methods for displaying autoflight information and controlling autoflight systems. In one embodiment, a flight deck for an aircraft having an autoflight system includes at least one pilot seat, at least one window positioned forward of the pilot seat, and at least one instrument panel positioned forward of the pilot seat. In one aspect of this embodiment, the forward window provides a forward field of view out of the aircraft for a pilot seated in the pilot seat. In another aspect of this embodiment, the flight deck further includes a display device configured to provide information related to one or more autoflight modes. The display device can be positioned at least approximately between the forward instrument panel and the forward window to provide the pilot with autoflight information at least proximate to the forward field of view. In a further aspect of this embodiment, the display device can be configured to provide information related to one or more target flight parameters.

In another embodiment, the flight deck includes a glare shield positioned adjacent to the lower portion of the forward window to reduce glare on one or more flight instruments positioned on the forward instrument panel. In another aspect of this embodiment, the flight deck further includes a display device configured to provide information related to one or more autoflight modes. The display device can be positioned at least proximate to the glare shield to provide the pilot with autoflight information at least proximate to the forward field of view.

In a further embodiment, a method for manufacturing a flight deck for an aircraft having an autoflight system includes situating at least one pilot seat on the flight deck, installing at least one window forward of the pilot seat to provide a forward field of view out of the aircraft for a pilot seated in the pilot seat, and placing an instrument panel forward of the pilot seat. In one aspect of this embodiment, the method further includes providing a display device configured to provide information related to one or more autoflight modes, and positioning the display device at least approximately between the forward instrument panel and the forward window. In another aspect of this embodiment, providing the display device can include configuring the display device to include information related to one or more target flight parameters, and positioning the display device can include installing the display device at least proximate to the lower portion of the forward window.

In another embodiment, the method for manufacturing a flight deck includes positioning a glare shield adjacent to the lower portion of the forward window to reduce glare on one or more flight instruments positioned on the forward instrument panel. In one aspect of this embodiment, positioning the display device includes installing the display device at least proximate to the glare shield. In a further embodiment, the method includes positioning at least one PFD at least proximate to the forward instrument panel. In one aspect of this embodiment, positioning the display device includes installing the display device closer to the forward window than the PFD.

BRIEF DESCRIPTION OF THE DRAWINGS

FIG. 7 illustrates a table of naming conventions for flight modes or situations in accordance with embodiments of the invention.

FIG. 8 is a forward elevational view of an autoflight performance selector of FIG. 4 in accordance with embodiments of the invention.

DETAILED DESCRIPTION

Figure 1:
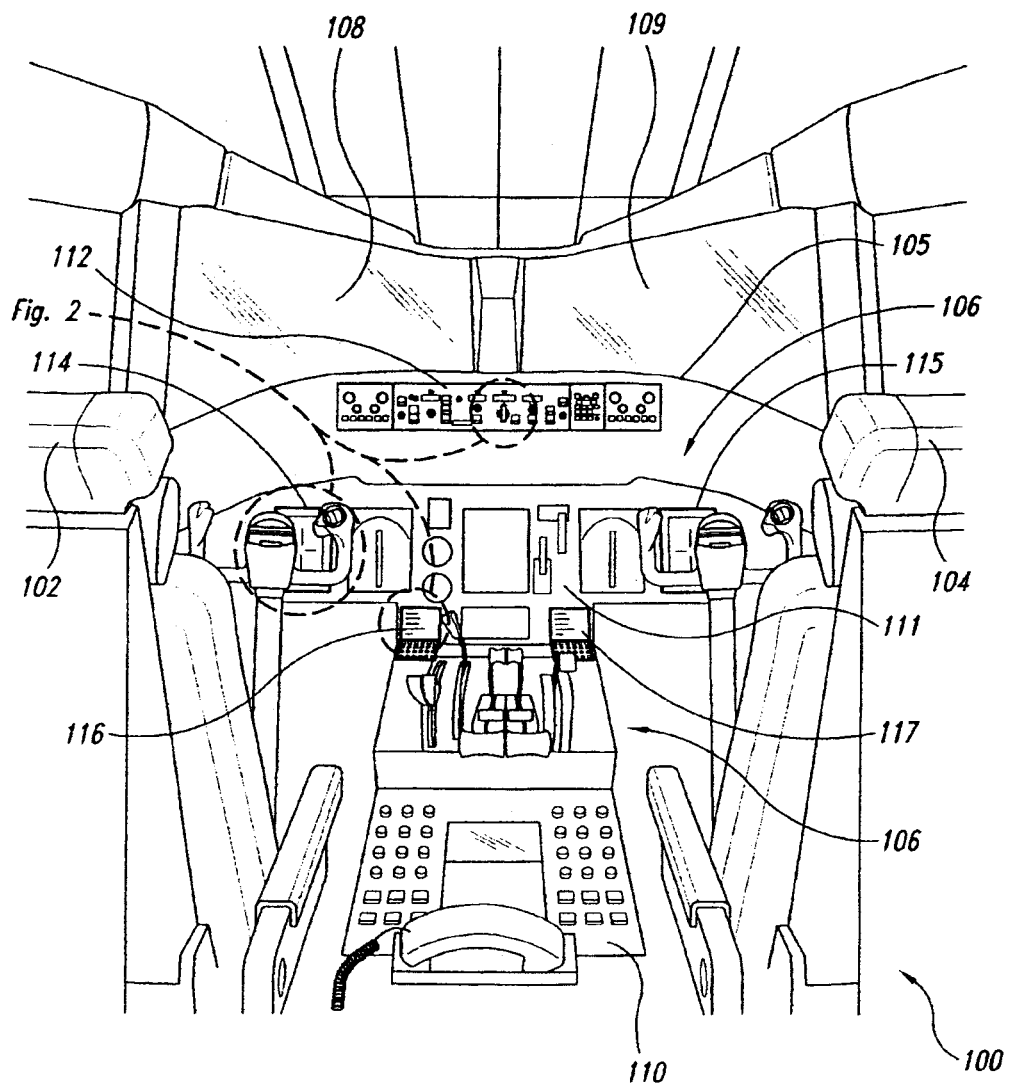
FIG. 1 illustrates a flight deck of an aircraft having a flight management system in accordance with the prior art.

The following disclosure describes apparatuses and methods for displaying autoflight information and controlling autoflight systems. Certain specific details are set forth in the following description and in FIGS. 3-8 to provide a thorough understanding of various embodiments of the invention. Well-known structures and systems often associated with aircraft autoflight systems have not been shown or described in detail below to avoid unnecessarily obscuring the description of the various embodiments of the invention. In addition, those of ordinary skill in the relevant art will understand that additional embodiments of the present invention may be practiced without several of the details described below.

In the drawings, identical reference numbers identify identical or generally similar elements. To facilitate the discussion of any particular element, the most significant digit or digits in any reference number refer to the figure in which that element is first introduced. For example, element 322 is first introduced and discussed in reference to FIG. 3. In addition, any dimensions, angles, and other specifications shown in the figures are merely illustrative of particular embodiments of the invention. Accordingly, other embodiments of the invention can have other dimensions, angles, and specifications without departing from the spirit or scope of the present invention.

Figure 3:
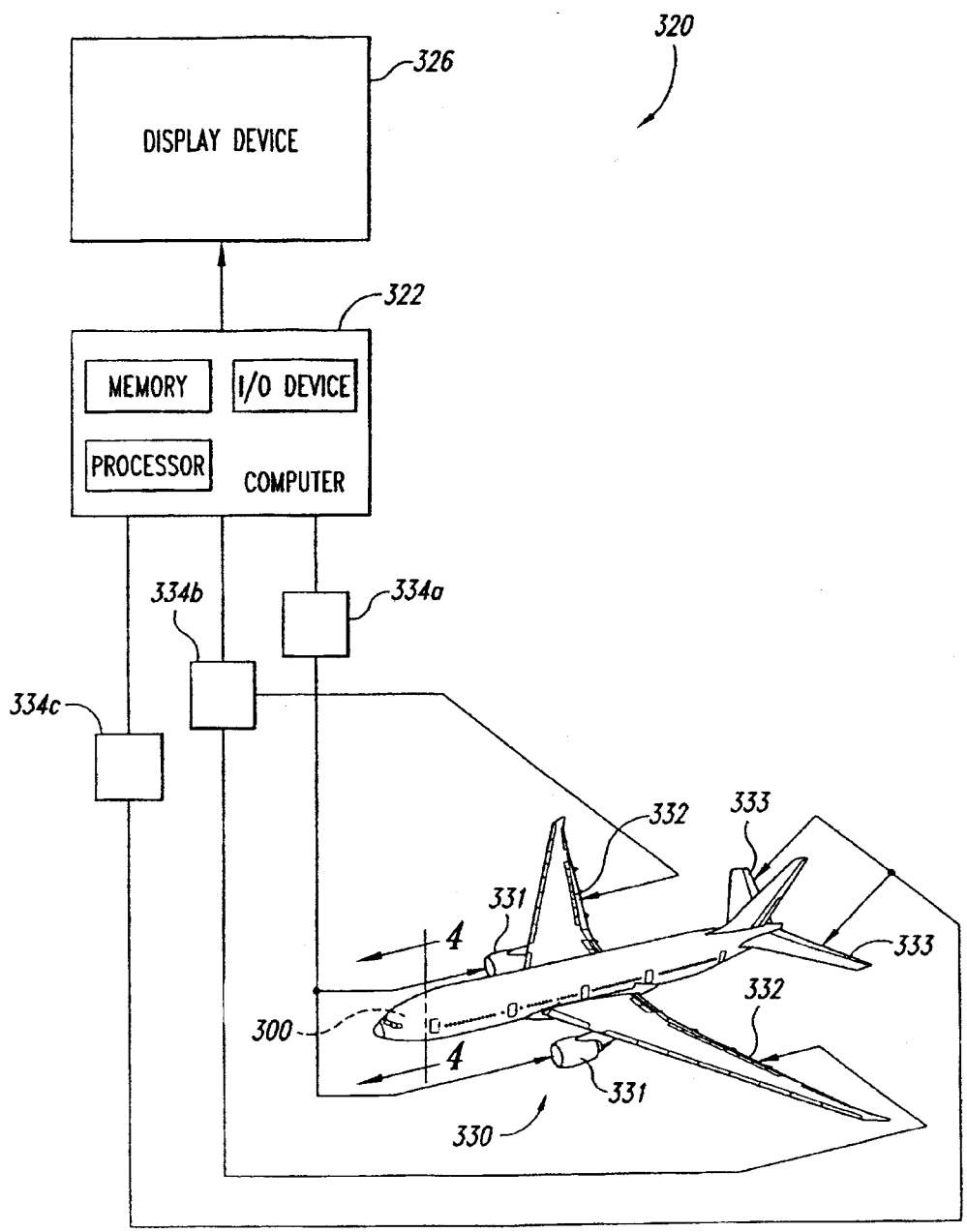
FIG. 3 is a schematic illustration of an aircraft having an autoflight system with a display device in accordance with an embodiment of the invention.

FIG. 3 is a schematic illustration of an aircraft 330 having an autoflight system 320 with a display device 326 in accordance with an embodiment of the invention. In one aspect of this embodiment, the autoflight system 320 can include a flight management computer 322 linked to one or more controllers 334, such as an engine controller or autothrottle 334a, a roll controller 334b, and a pitch controller 334c. The engine controller 334a can be operatively coupled to engines 331 of the aircraft 330 to automatically control engine functions, such as engine thrust. The roll controller 334b can be operatively coupled to ailerons 332 of the aircraft 330, and the pitch controller 334c can be operatively coupled to elevators 333 of the aircraft 330. In one embodiment, the roll controller 334b and the pitch controller 334c can form a portion of an integrated autopilot device. In another embodiment, the roll controller 334b and the pitch controller 334c can be independent. In either embodiment, the controllers 334a-c can automatically control the aircraft thrust, roll, and pitch.

In a further aspect of this embodiment, the flight management computer 322 can also be linked to the display device 326 to provide the display device 326 with information relating to the operation of the controllers 334. In addition, the flight management computer 322 can also receive instructions for the autoflight system 320 via the display device 326. Pilot inputs and/or external sources, such as telemetry from the ground, a satellite, a datalink or a gatelink, can provide these instructions.

In another aspect of this embodiment, the display device 326 is centrally located in a forward field of view of a pilot (not shown) on a flight deck 300 of the aircraft 330. As is described in greater detail below, the display device 326 can include one or more input devices configured to receive pilot instructions for controlling the autoflight system 320. In addition, the display device 326 can include one or more display screens configured to provide the pilot with information about how the autoflight system 320 is flying the aircraft 330, such as information related to one or more autoflight modes and/or one or more target flight parameters.

The term "autoflight mode" as used herein can refer to the particular manner in which the autoflight system 320 is flying the aircraft 330. For example, in one embodiment, autoflight modes can relate to airspeed (e.g., increasing, decreasing, or maintaining airspeed); vertical guidance (e.g., climbing, descending, or maintaining altitude); and/or lateral guidance (e.g., turning or maintaining a heading). In one aspect of this embodiment, these autoflight modes can be represented by conventional flight mode annunciators (FMA's). In other embodiments, these autoflight modes can be represented by other symbology, including other textual shorthands. The term "target flight parameter" as used herein can refer to the particular values of airspeed, altitude, heading, tracks and/or course to which the autoflight system 320 is actually instructed to fly.

For example, in one embodiment, the display device 326 can provide the following autoflight information: "DESCEND TO 14000 FT." Here, the autoflight mode "descend" indicates that the autoflight system 320 is instructed to cause the aircraft 330 to descend, and the target flight parameter "14000 FT" indicates that the autoflight system 320 is instructed to cause the aircraft 330 to descend to an altitude of 14000 feet. In other embodiments, the display device 326 can provide the pilot with other types of autoflight system information. Accordingly, the display device 326 can enable the pilot to quickly obtain current autoflight information and, if desired, change autoflight instructions, without having to refer to multiple locations around the flight deck 300.

Figure 2:
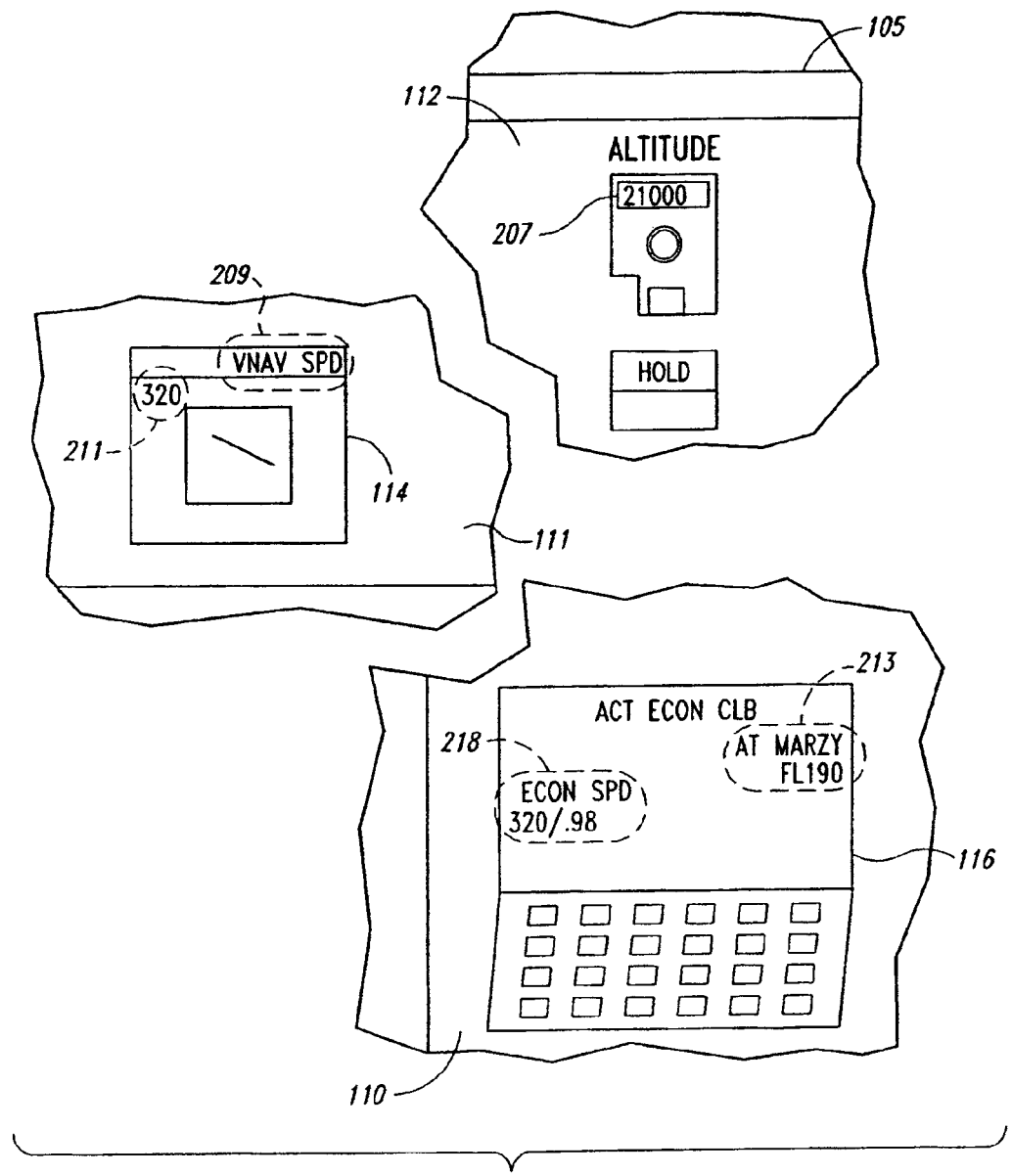
FIG. 2 is an enlarged view of portions of the prior art flight deck of FIG. 1 showing a mode control panel (MCP), a first primary flight display (PFD), and a first control display unit (CDU).
Figure 4:
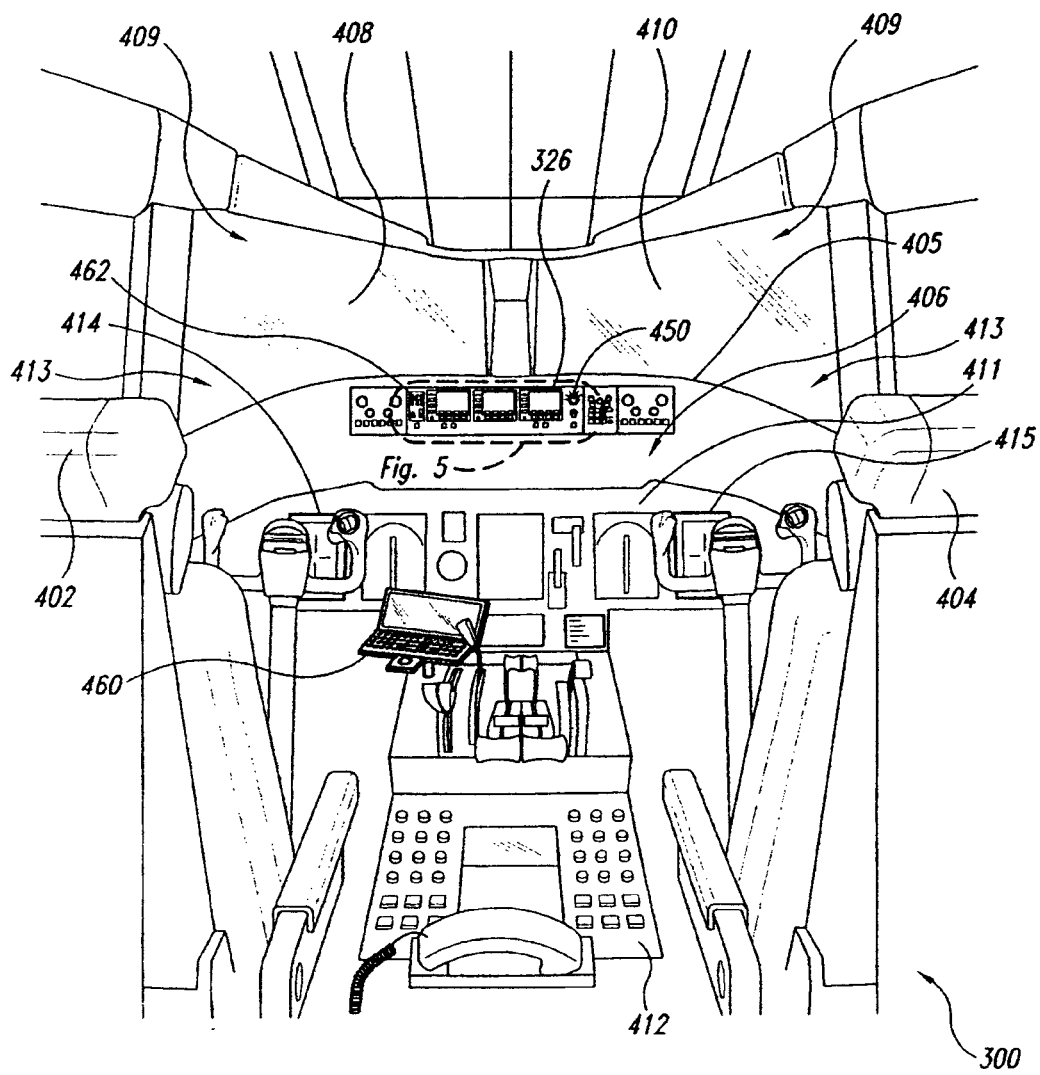
FIG. 4 is a forward elevational view of a flight deck of the aircraft of FIG. 3 with the display device configured in accordance with an embodiment of the invention, taken along line 4-4 in FIG. 3.

FIG. 4 is a forward elevational view of the flight deck 300 with the display device 326 configured in accordance with an embodiment of the invention, taken along line 4-4 in FIG. 3. In one aspect of this embodiment, the flight deck 300 includes first and second forward windows 408 and 410 providing a forward field of view out of the aircraft 330 (FIG. 3) for a first pilot (not shown) seated in a first pilot seat 402, and a second pilot (also not shown) seated in a second pilot seat 404. Each of the first and second forward windows 408 and 410 can include an upper portion 409 and a lower portion 413. In other embodiments, the first and second forward windows 408 and 410 can be replaced by one or more external vision screens that include a visual display of a forward field of view out of the aircraft 330 similar to a window. Accordingly, throughout this disclosure, the term "window" can include such external vision screens. In another aspect of this embodiment, a glare shield 405 is positioned adjacent to the lower portions 413 of the forward windows 408 and 410 to reduce glare on one or more flight instruments 406 positioned on a control pedestal 412 and a forward instrument panel 411. The flight instruments 406 can include first and second PFD's 414 and 415 that are at least generally similar to the first and second PFD's 114 and 115 discussed above with reference to FIGS. 1 and 2. In a further aspect of this embodiment, the first and second PFD's 414 and 415 can be utilized in conjunction with the display device 326 to provide the pilot with actual flight parameter information. In other embodiments, one or both of the first and second PFD's 414 and 415 can be omitted and other flight instruments can provide this information.

In one embodiment, the display device 326 is positioned at least adjacent to the first and second forward windows 408 and 410. For example, in the illustrated embodiment, the display device 326 is positioned adjacent to the lower portions 413 of the first and second forward windows 408 and 410 between the first and second PFD's 414 and 415 and the first and second forward windows 408 and 410. In one aspect of this embodiment, the display device 326 is positioned at least proximate to the glare shield 405. In other embodiments, the display device 326 can be positioned at other locations on the flight deck 300. For example, in another embodiment, the display device 326 can be positioned above the first and second forward windows 408 and 410. In yet other embodiments, the display device 326 can be positioned at other locations on the flight deck 300 without departing from the spirit or scope of the present invention.

The flight deck 300 can include a number of devices for entering flight guidance data into the flight management computer 322 (FIG. 3) in accordance with embodiments of the present invention. For example, in one embodiment, the flight deck 300 can include a first data entry device 460, a second data entry device 462, and an autoflight performance selector 450. In one aspect of this embodiment, the first data entry device 460 can be accessibly positioned forward of the first pilot seat 402 and/or the second pilot seat 404, and can include an alphanumeric keypad, a cursor control device (e.g., a track ball or touch screen), and/or a display screen for entry and/or manipulation of alphanumeric flight guidance data, such as strategic flight guidance data. In one embodiment, the first data entry device 460 can be used to input at least a portion of a flight plan or other strategic guidance information into the flight management computer 322 and/or the display device 326. In other embodiments, the first data entry device 460 can be used to input other types of flight guidance information, such as tactical guidance information, into the flight management computer 322.

In another aspect of this embodiment described in greater detail below, the second data entry device 462 can be accessibly positioned adjacent to the display device 326 and can include a small alphanumeric keypad device having a touch screen and/or hard buttons for entry and/or manipulation of alphanumeric flight guidance data, such as tactical flight guidance information. In a further aspect of this embodiment that will also be described in greater detail below, the autoflight performance selector 450 can be used in conjunction with the display device 326 to set the level at which the autoflight system 320 (FIG. 3) will respond to autoflight control inputs.

One feature of an embodiment shown in FIG. 4 is the placement of the display device 326 in the forward field of view. An advantage of this feature is that pilots can quickly ascertain autoflight guidance information without having to look at two or more places on the flight deck 300 outside the forward field of view. In contrast, conventional flight decks on aircraft having flight management systems (such as that shown in FIGS. 1 and 2) may require the pilot to refer to an MCP, a PFD, and a CDU to obtain current autoflight guidance information.

Figure 5:
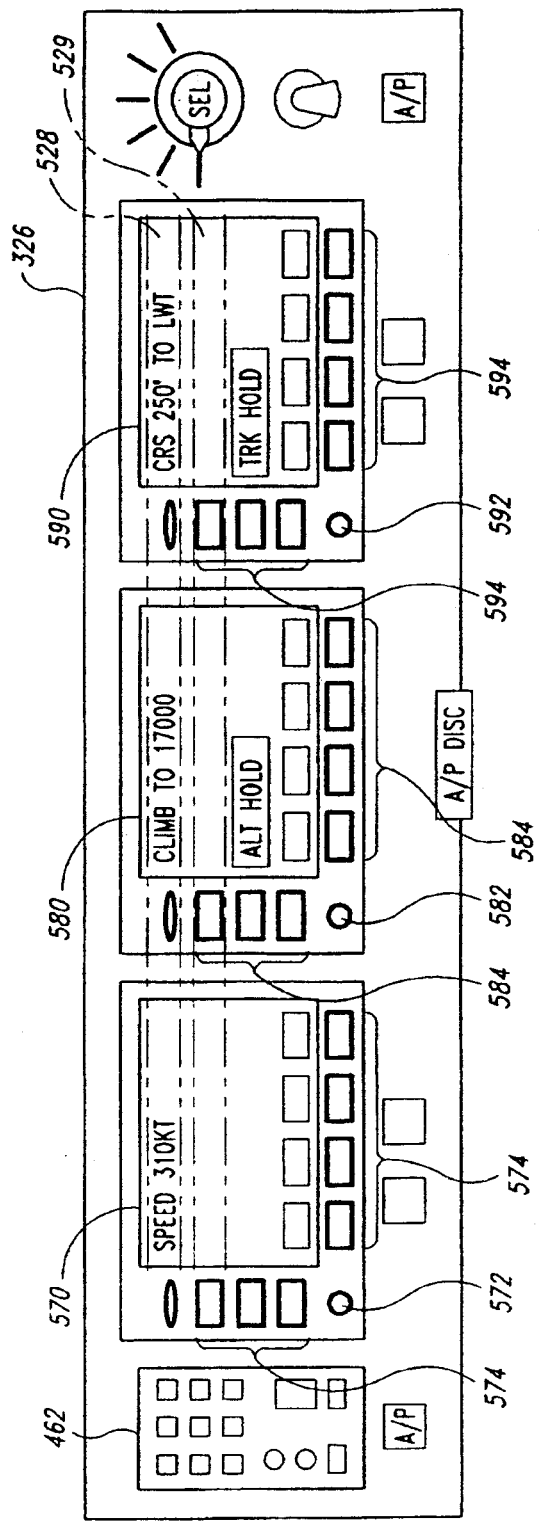
FIG. 5 is an enlarged view of the display device of FIG. 4 in accordance with an embodiment of the invention.

FIG. 5 is an enlarged view of the display device 326 of FIG. 4 in accordance with an embodiment of the invention. In one aspect of this embodiment, the display device 326 can include one or more displays for providing autoflight guidance information, such as an airspeed or first display 570, a vertical guidance or second display 580, and a lateral guidance or third display 590. In another aspect of this embodiment, the first, second, and third displays 570, 580, and 590 can collectively include an active situation line 528 and a next event line 529. The active situation line 528 can extend across top portions of the displays 570, 580, and 590 and can provide guidance information describing the current manner in which the autoflight system 320 (FIG. 3) is controlling the aircraft 330 (FIG. 3). For example, in one embodiment, the active situation line 528 can include one or more autoflight modes and/or one or more target flight parameters. The next event line 529 similarly extends across the displays 570, 580 and 590 just below the active situation line 528, and can include information describing the next sequence of instructions for the autoflight system 320. In other embodiments, the display device 326 can include more or fewer displays configured to provide other types of autoflight guidance information without departing from the spirit or scope of the present invention.

In one embodiment, the portion of the active situation line 528 included in the first display 570 can include a target flight parameter and/or an autoflight mode relating to the current airspeed of the autoflight system 320 (FIG. 3). The guidance control from the autoflight system 320 to achieve and/or maintain this airspeed may include pitch changes (e.g., pitch up to slow down or pitch down to accelerate) as well as autothrottle changes (e.g., less thrust to slow down or more thrust to accelerate). In other embodiments, the first display 570 can include other autoflight information in addition to, or in place of, the target airspeed information described above.

In another embodiment, the portion of the active situation line 528 presented in the second display 580 can include a target flight parameter and/or an autoflight mode relating to the current vertical guidance of the autoflight system 320. For example, in one aspect of this embodiment, the second display 580 can include information indicating whether the autoflight system 320 is providing guidance to the aircraft 330 (FIG. 3) causing the aircraft 330 to cruise in level flight, climb unrestricted, descend unrestricted, or descend on a geometric flight path. In another aspect of this embodiment, the second display 580 can include the current altitude target. In other embodiments, the second display 580 can include other autoflight guidance information in addition to, or in place of, the information described above.

In a further embodiment, the portion of the active situation line 528 included in the third display 590 can include a target flight parameter and/or an autoflight mode relating to the current lateral guidance of the autoflight system 320. For example, in one aspect of this embodiment, the third display 590 can include information indicating whether the autoflight system 320 is providing guidance to the aircraft 330 causing the aircraft 330 to proceed along a preplanned course to a navigation point, or to proceed along an unrestricted heading or track vector. In the case where the lateral guidance is along a heading or track vector, the next event line 529 of the third display 590 can be blank, indicating that the vector in the active situation line 528 is not linked to a subsequent preplanned strategic lateral guidance plan. Conversely, in the case where the heading or track vector is linked to a subsequent preplanned course, the next event line 529 of the third display 590 can show the point where the track vector joins the preplanned course. In another aspect of this embodiment, the third display 590 can include the current lateral guidance target. In other embodiments, the third display 590 can include other autoflight guidance information in addition to, or in place of, the information described above.

In one embodiment, the current autoflight guidance information provided in the active situation line 528 can include conventional FMA's. In other embodiments, the current autoflight guidance information can be provided using other naming conventions or symbology to describe the current autoflight "situation." For example, in the illustrated embodiment, the first display 570 shows the current target airspeed of the autoflight system 320 (FIG. 3) is 310 knots. The second display 580 shows the current target altitude of the autoflight system 320 is 17,000 feet, and the current vertical autoflight mode is "climb." The third display 590 shows the current target course of the autoflight system 320 is to maintain a course of 250° to navigation waypoint LWT. From the foregoing description, those of ordinary skill in the relevant art will appreciate that embodiments of the present invention can provide in a single location much of the autoflight guidance information traditionally provided on remotely positioned MCP's, PFD's, and/or CDU's.

In one embodiment, the display device 326 can include an array of software-configurable controls for editing the active situation line 528 and/or the next event line 529 with new instructions (i.e., tactical data) for the autoflight system 320 (FIG. 3). These instructions can be received from the pilot and/or from a ground-based station, such as a telemetry uplink. For example, in one aspect of this embodiment, the display device 326 can include a first set of selector buttons 574 and a first rotary knob 572 adjacent to the first display 570 for implementing changes to the current airspeed guidance. In another aspect of this embodiment, the display device 326 can include a second set of selector buttons 584 and a second rotary knob 582 adjacent to the second display 580 for implementing changes to the current vertical guidance. In a further aspect of this embodiment, the display device 326 can include a third set of selector buttons 594 and a third rotary knob 592 adjacent to the third display 590 for implementing changes to the lateral guidance. In other embodiments, the display device 326 can include other features for implementing changes to the current flight guidance instructions or, conversely, one or more of the features described above can be omitted, without departing from the spirit or scope of the present invention.

In one embodiment described in greater detail below in reference to FIGS. 6A-6D, the pilot can use the selector buttons 574, 584, and/or 594 to select a desired data entry function, and the pilot can then use the rotary knobs 572, 582, and/or 592, and/or the second data entry device 462, to enter actual alphanumeric guidance data on the displays 570, 580, and 590. As mentioned above in reference to FIG. 4, the second data entry device 462 can include a small alphanumeric keypad device having a touch screen and/or hard buttons for entry of such alphanumeric data. For example, in one embodiment, the pilot can use the secondary data entry device 462 to enter airspeeds on the first display 570, altitudes on the second display 580, and headings and/or track vectors on the third display 590. In another embodiment, the pilot can enter other alphanumeric guidance data (e.g., strategic data) on the displays 570, 580, and/or 590 via the first data entry device 460 (FIG. 4).

Figure 6C:
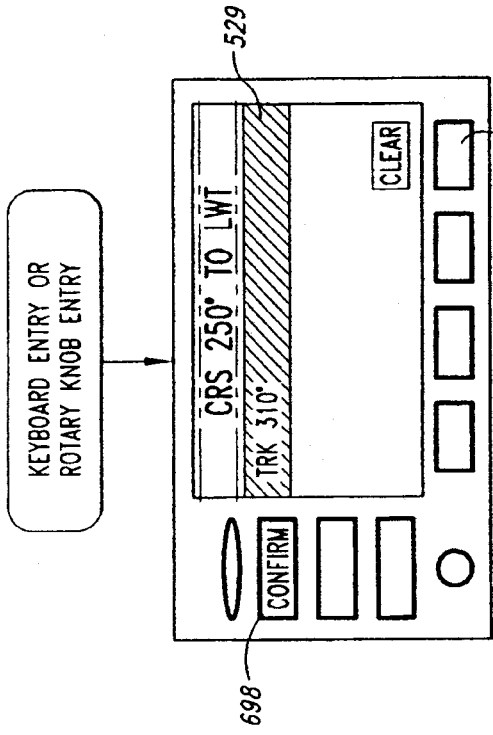
FIGS. 6A-6D illustrate a sequence for changing current or tactical autoflight guidance instructions in accordance with embodiments of the invention.
Figure 6D:
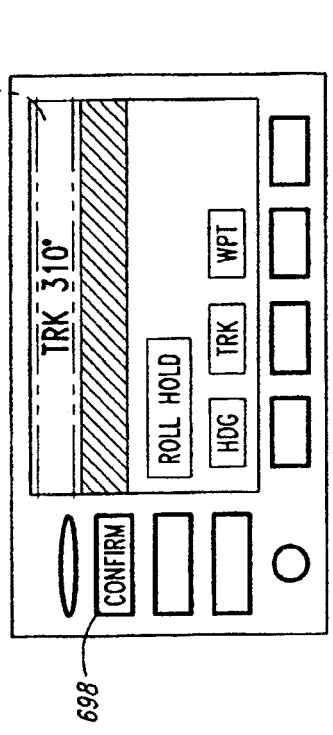
Figure 6A:
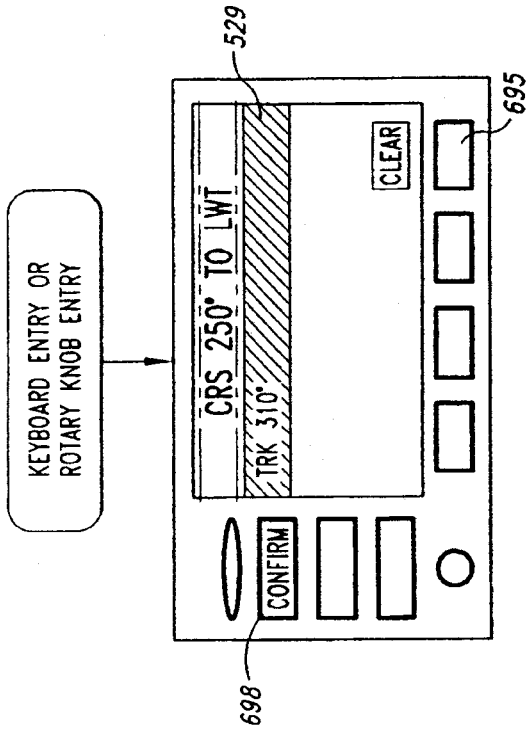
Figure 6B:
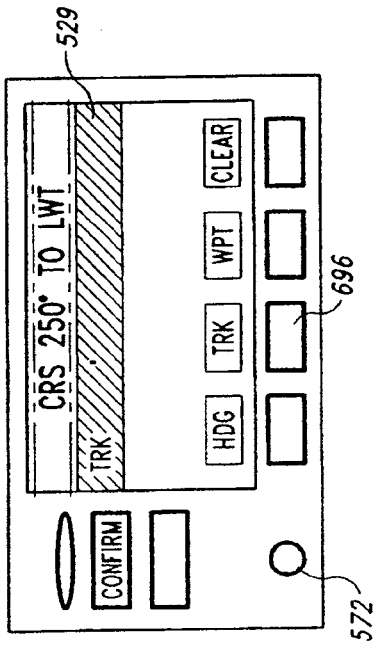

FIGS. 6A-6D illustrate a sequence for changing current or tactical autoflight guidance instructions in accordance with embodiments of the invention. In this example, the pilot changes the lateral guidance (as presented in the portion of the active situation line 528 shown in the third display 590) from "a course of 250° to navigation point LWT," to "a constant track vector of 310°. Referring first to FIG. 6A, the pilot can begin by selecting a TRK button 696. Referring to FIG. 6B, selecting the TRK button 696 generates a "TRK" display in the next event line 529. At this point in the sequence, the pilot can enter a numeric value (e.g., "310") for the new track instruction using either the first rotary knob 572, the second data entry device 462 (FIGS. 4 and 5), and/or the first data entry device 460 (FIG. 4) After doing so, the new track vector of "TRK 310°" is displayed in the next event line 529, as shown in FIG. 6C. The pilot can confirm the track vector of 310° by selecting a confirm button 698 or, alternatively, the pilot can delete this entry by selecting a clear button 695. Referring now to FIG. 6D, after the pilot selects the confirm button 698, the track vector of 310° is entered in the active situation line 528 and becomes the current or active lateral guidance instruction.

The sequence described above for inputting tactical guidance instructions into the flight management computer 322 (FIG. 3) via the display device 326 (FIGS. 4 and 5) is merely one example of the various methods possible with the present invention. Accordingly, those of ordinary skill in the relevant art will appreciate that other methods and features for performing this function can be used. For example, in another embodiment, a data entry device at least generally similar to a conventional CDU can be used to input such autoflight guidance instructions.

FIG. 7 illustrates a table 728 of naming conventions for various autoflight modes or "situations" that can be displayed in the active situation line 528 and the next event line 529 of FIGS. 5 and 6, in accordance with embodiments of the invention. In one aspect of these embodiments, the table 728 includes a situation column 729, a first display column 770, a second display column 780, and a third display column 790. The situation described in the situation column 729 corresponds to the set of naming conventions shown in the adjacent portions of the columns 770, 780, and 790. For example, as shown in row 727, if the first display 570 (FIG. 5) shows "Speed M.98\350 KT," and the second display 580 (FIG. 5) shows "Descend to 14,000 FT," then the current autoflight guidance instruction is "Descend at 0.98 to the CAS/Mach Transition and then descend at 350 kt to 14000 ft."

In one embodiment, the display device 326 (FIGS. 4 and 5) can utilize all or some of the naming conventions shown in FIG. 7 to describe one or more autoflight modes. In other embodiments, other naming conventions can be used to represent autoflight information via the display device 326. For example, in one embodiment as explained above, conventional FMA's can be used to represent autoflight information in one or more of the first, second and third displays 570, 580, and/or 590 of FIG. 5.

As discussed above, there are a number of methods for entering autoflight guidance instructions into the flight management computer 322 (FIG. 3) via the display device 326. Some embodiments include utilizing the first and second data entry devices 460 and 462 (FIG. 4). In other embodiments, flight guidance data, such as datalinked guidance data, can be received via one or more ground-based stations and input into the flight management computer 322 via the display device 326. For example, in one embodiment, an air traffic control station can send the guidance data to the flight deck. In one aspect of this embodiment, the first data entry device 460 can provide this information to the pilot. In another embodiment, this guidance data can be displayed on the next event line 528 of the display device 326. In another embodiment, a CDU can provide this information to the pilot. In one aspect of this embodiment, after confirming the desirability of this guidance information, the pilot can input it into the flight management computer 322 by transferring it to the display device 326 and selecting the confirm button 698 (FIG. 6), which promotes this data to the active situation line 528 (FIGS. 5 and 6). In another embodiment, a ground-based station operated by an airline can send this flight guidance information to the flight deck. In other embodiments, this information can be transmitted to the flight deck in other ways without departing from the spirit or scope of the present invention.

FIG. 8 is an elevation view of the autoflight performance selector 450 of FIG. 4 in accordance with an embodiment of the invention. In one aspect of this embodiment, the autoflight performance selector 450 includes a rotary selector knob 852 for controlling the overall performance of the autoflight system 320 (FIG. 3) in all axes (i.e., pitch, roll, and yaw). In another embodiment, the autoflight performance selector can be used to control the performance of the autoflight system 320 in two or more axes (e.g., pitch and roll, pitch and yaw, or roll and yaw). In other embodiments, the autoflight performance selector 450 can include other features for controlling performance of the autoflight system 320 along individual axes by controlling discrete elements of the autoflight system 320.

In another aspect of this embodiment, the autoflight performance selector 450 provides the pilot with a way to limit or otherwise control the dynamic response of the autoflight system 320 to autoflight guidance inputs. The "min" and "max" positions of the rotary knob 852 provide an adjustable setting that can, for example, limit the amount of roll and/or pitch that is permitted, and/or the amount of vertical speed change that is possible. In one aspect of this embodiment, selecting the "min" position limits the aircraft to gentle maneuvers to maximize passenger comfort. In another aspect of this embodiment, selecting the "max" position allows the aircraft to make more aggressive maneuvers. One advantage of controlling the performance of the autoflight system 320 in two or more axes is that the pilot can select a single response level that applies to all relevant axes without having to provide further control inputs.

In another embodiment, the autoflight performance selector 450 can be equipped with an override function for those situations where aggressive movement of the aircraft is necessary in response to, for example, Air Traffic Control or an emergency situation. In one aspect of this embodiment, the override function enables the autoflight system 320 to override the autoflight performance selector 450 in such situations and permit aggressive movement of the aircraft.

Although the autoflight performance selector 450 of the embodiment described above is a rotary knob, in other embodiments, the autoflight performance selector can have other forms. For example, in another embodiment, the autoflight performance selector 450 can include a rocker switch having at least two positions, such as an "on" position and an "off" position. In a further embodiment, the autoflight performance selector 450 can include a display (e.g., a computer screen) and a cursor control device (e.g., a mouse). The display can include at least two selections (e.g., buttons, icons or sliders) that can be activated using the cursor control device (e.g., by "clicking" the mouse on a button or icon or by "dragging" the slider). Accordingly, the performance selector 450 configured in accordance with embodiments of the present invention can take many forms in addition to those described above.

From the foregoing, it will be appreciated that specific embodiments of the invention have been described herein for purposes of illustration, but that various modifications may be made without deviating from the spirit or scope of the invention. For example, while the display device 326 has been described here with three displays, in other embodiments, the display device 326 can have more or fewer displays depending on the particular application. In addition, although the display device 326 is illustrated in FIG. 4 positioned at least proximate to the glare shield 405, in other embodiments, the display device 326 can assume other positions within the flight deck 300. Accordingly, the invention is not limited except as by the appended claims.

We claim:

1. An autoflight system for use with an aircraft, the aircraft including a window positioned forward of a pilot seat, and a forward instrument panel positioned in front of the pilot seat in the pilot's forward field of view, the autoflight system comprising:
   an autothrottle;
   an autopilot;
   a flight management computer configured to control the autothrottle and the autopilot; and
   a display device operatively connected to the flight management computer and configured to exchange information with the flight management computer, the display device including:
      a first display screen configured to provide autoflight mode information related to airspeed;
      a second display screen positioned at least approximately adjacent to the first display screen, the second display screen configured to provide autoflight mode information related to vertical guidance; and a third display screen positioned at least approximately adjacent to at least one of the first and second display screens, the third display screen configured to provide autoflight mode information related to lateral guidance; and wherein the aircraft further includes at least one primary flight display (PFD) positioned at least proximate to the forward instrument panel, and wherein the display device is positioned closer to the forward field of view than the PFD is to the forward field of view.

2. The autoflight system of claim 1, wherein the first display screen is configured to provide target flight parameter information related to airspeed, wherein the second display screen is configured to provide target flight parameter information related to altitude, and wherein the third display screen is configured to provide target flight parameter information related to lateral direction.

3. The autoflight system of claim 1, further comprising a data entry device positioned at least proximate to at least one of the first, second, and third display screens, the data entry device configured to receive input for the flight management computer.

4. The autoflight system of claim 1, further comprising a data entry device positioned at least proximate to at least one of the first, second, and third display screens, the data entry device configured to receive input for the flight management computer via a rotary knob.

5. The autoflight system of claim 1, wherein the active situation line includes first autoflight mode and target flight parameter information related to the manner in which the autoflight system is controlling the aircraft, and wherein the next event line includes second autoflight mode and target flight parameter information related to the manner in which the autoflight system will be controlling the aircraft.

6. The autoflight system of claim 1, wherein the first, second, and third display screens are configured to collectively display an active situation line, wherein the active situation line includes information related to the manner in which the autoflight system is controlling the aircraft.

7. The autoflight system of claim 1, wherein the first, second, and third display screens are configured to collectively display a next event line, wherein the next event line includes information related to the manner in which the autoflight system will be controlling the aircraft.

8. An autoflight system for use with an aircraft, the aircraft including a window positioned forward of a pilot seat, and a forward instrument panel positioned in front of the pilot seat in the pilot's forward field of view, the autoflight system comprising:

an autothrottle;
an autopilot;
a flight management computer configured to control the autothrottle and the autopilot; and
a display device operatively connected to the flight management computer and configured to exchange information with the flight management computer, the display device including:
a first display screen configured to provide autoflight mode information related to airspeed;
a second display screen positioned at least approximately adjacent to the first display screen, the second display screen configured to provide autoflight mode information related to vertical guidance; and
a third display screen positioned at least approximately adjacent to at least one of the first and second display screens, the third display screen configured to provide autoflight mode information related to lateral guidance, wherein the first, second, and third display screens are configured to collectively display an active situation line, wherein the active situation line includes information related to the manner in which the autoflight system is controlling the aircraft, wherein the aircraft further includes a primary flight display (PFD) positioned at least proximate to the forward instrument panel, wherein the display device is positioned closer to the forward field of view than the PFD is to the forward field of view.

9. The autoflight system of claim 8, wherein the first, second, and third display screens are configured to collectively display the active situation line and a next event line, wherein the active situation line includes first information related to the manner in which the autoflight system is currently controlling the aircraft, and wherein the next event line includes second information related to the manner in which the autoflight system will be controlling the aircraft.

10. The autoflight system of claim 9, wherein the first, second, and third display screens are arranged in a horizontal line and are configured to collectively display the active situation line and a next event line.

11. An autoflight system for use with an aircraft, the aircraft including a window positioned forward of a pilot seat, and a forward instrument panel positioned in front of the pilot seat in the pilot's forward field of view, the autoflight system comprising:

an autothrottle;
an autopilot;
a flight management computer configured to control the autothrottle and the autopilot; and
a display device operatively connected to the flight management computer and configured to exchange information with the flight management computer, the display device including:
a first display screen configured to provide autoflight mode information related to airspeed;
a second display screen positioned at least approximately adjacent to the first display screen, the second display screen configured to provide autoflight mode information related to vertical guidance; and
a third display screen positioned at least approximately adjacent to at least one of the first and second display screens, the third display screen configured to provide autoflight mode information related to lateral guidance, wherein the first, second, and third display screens are configured to collectively display a next event line, wherein the next event line includes information related to the manner in which the autoflight system will be controlling the aircraft, wherein the aircraft further includes a primary flight display (PFD) positioned at least proximate to the forward instrument panel, wherein the display device is positioned closer to the forward field of view than the PFD is to the forward field of view.

12. An autoflight system for automatically controlling thrust, roll and pitch of an aircraft, the aircraft including a window positioned forward of a pilot seat, a forward instrument panel positioned in front of the pilot seat in the pilot's forward field of view, and a glare shield positioned below the window and above the forward instrument panel, wherein the glare shield is configured to reduce glare on one or more flight instruments positioned on the forward instrument panel, and wherein the autoflight system comprises:

an autothrottle;
an autopilot;
a flight management computer configured to control the autothrottle and the autopilot; and
a display device incorporated into the glareshield in the pilot's forward field of view, wherein the display device receives autoflight mode information from the flight management computer, the display device including:
 a first display screen configured to provide autoflight mode information related to airspeed;
 a second display screen positioned at least approximately adjacent to the first display screen, the second display screen configured to provide autoflight mode information related to vertical guidance; and
 a third display screen positioned at least approximately adjacent to at least one of the first and second display screens, the third display screen configured to provide autoflight mode information related to lateral guidance wherein the aircraft further includes at least one primary flight display (PFD) positioned at least proximate to the forward instrument panel, wherein the display device is positioned closer to the forward field of view than the PFD is to the forward field of view.

13. The autoflight system of claim 12, further comprising an autoflight performance selector positioned at least generally forward of the pilot seat, the autoflight performance selector configured to control the response of the autoflight system to autoflight guidance input.

14. The autoflight system of claim 12, further comprising an autoflight performance selector positioned at least generally forward of the pilot seat, the autoflight performance selector configured to control the rate of roll and pitch of the aircraft in response to autoflight guidance input.

15. An autoflight system for automatically controlling thrust, roll and pitch of an aircraft, the aircraft including a window positioned forward of a pilot seat, a forward instrument panel positioned in front of the pilot seat in the pilot's forward field of view, and a glare shield positioned below the window and above the forward instrument panel, wherein the glare shield is configured to reduce glare on one or more flight instruments positioned on the forward instrument panel, and wherein the autoflight system comprises:
 an autothrottle;
 an autopilot;
 a flight management computer configured to control the autothrottle and the autopilot; and
 a display device incorporated into the glareshield in the pilot's forward field of view, wherein the display device receives autoflight mode information from the flight management computer, the display device including:
  a first display screen configured to provide autoflight mode information related to airspeed;
  a second display screen positioned at least approximately adjacent to the first display screen, the second display screen configured to provide autoflight mode information related to vertical guidance; and
  a third display screen positioned at least approximately adjacent to at least one of the first and second display screens, the third display screen configured to provide autoflight mode information related to lateral guidance, wherein the first, second, and third display screens are configured to collectively display an active situation line, wherein the active situation line includes information related to the manner in which the autoflight system is controlling the aircraft, wherein the first display screen displays a first portion of the active situation line, the second display screen displays a second portion of the active situation line, and the third display screen displays a third portion of the active situation line, wherein the first, second, and third portions of the active situation line extend colinearly across the first, second, and third display screens, and wherein the first display screen displays the first portion of the active situation line in the absence of the second and third portions of the active situation line, the second display screen displays the second portion of the active situation line in the absence of the first and third portions of the active situation line, and the third display screen displays the third portion of the active situation line in the absence of the first and second portion of the active situation line.

16. The autoflight system of claim 15, wherein the first, second, and third display screens are further configured to collectively display a next event line, wherein the next event line includes information related to the manner in which the autoflight system will be controlling the aircraft, and wherein the first display screen displays a first portion of the next event line, the second display screen displays a second portion of the next event line, and the third display screen displays a third portion of the next event line, and wherein the first, second, and third portions of the next event line extend colinearly across the first, second, and third display screens.

17. The autoflight system of claim 16, wherein the first, second, and third display screens are arranged in a horizontal line.

* * * * *